July 19, 1927.

J. CHVOJKA

HAND TRUCK

Filed Oct. 5, 1925

INVENTOR
Joseph Chvojka
By W. W. Williamson Atty.

July 19, 1927.
J. CHVOJKA
HAND TRUCK
Filed Oct. 5, 1925
1,636,043
3 Sheets-Sheet 2
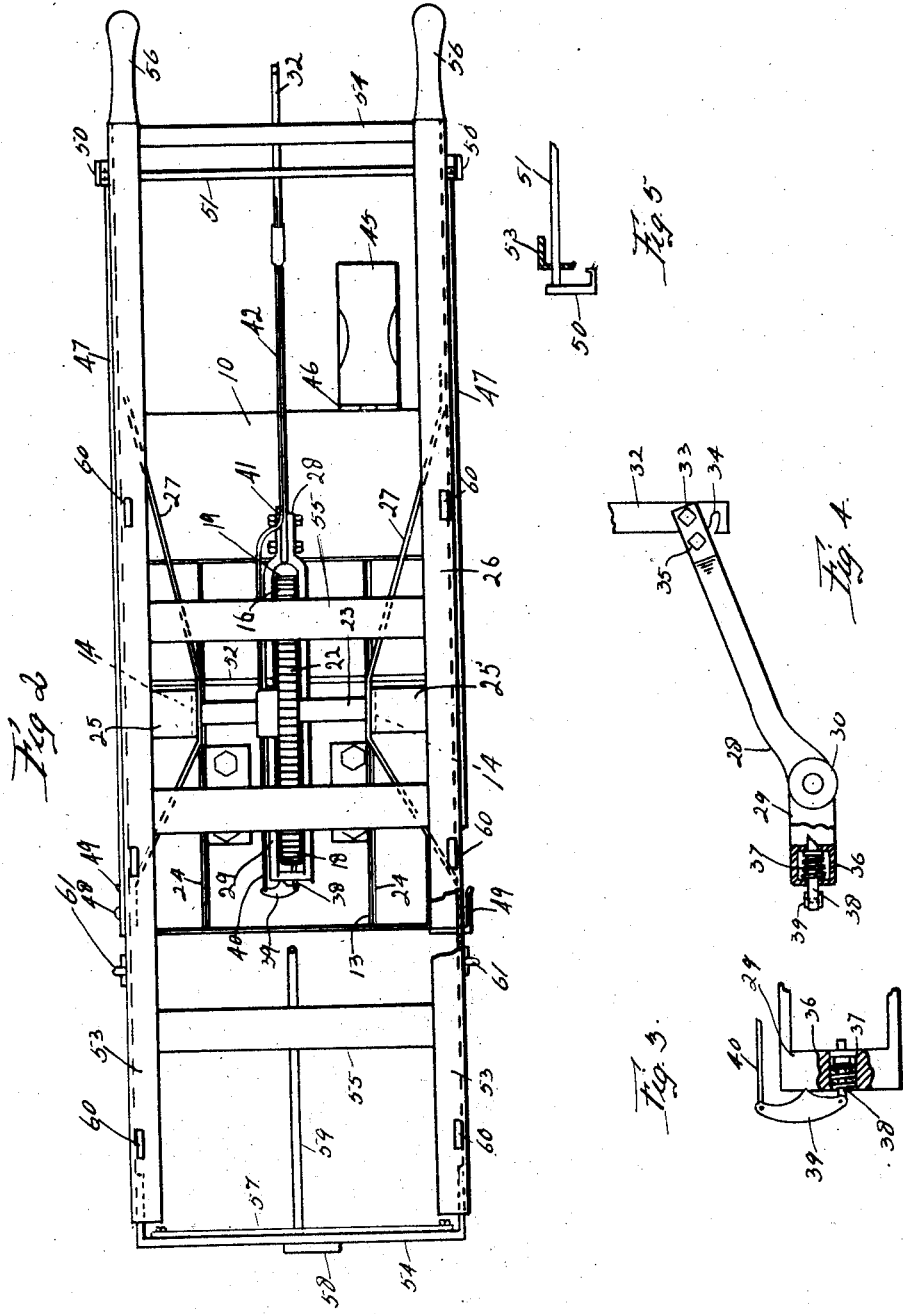
INVENTOR
Joseph Chvojka
By W.W.Williamson Atty.

July 19, 1927.

J. CHVOJKA 1,636,043

HAND TRUCK

Filed Oct. 5, 1925

INVENTOR
Joseph Chvojka
By W. W. Williamson Atty.

Patented July 19, 1927.

1,636,043

UNITED STATES PATENT OFFICE.

JOSEPH CHVOJKA, OF PHILADELPHIA, PENNSYLVANIA.

HAND TRUCK.

Application filed October 5, 1925. Serial No. 60,471.

My invention relates to a new and useful improvement in a hand truck and has for its primary object to improve the construction of a similar device covered by my application for Letters Patent bearing Serial No. 32,296, filed May 23, 1925.

Another object of my invention is to provide a unique method of transmitting motion to the truck platform in order to swing it from a vertical to a horizontal position.

A further object of the invention is to provide means controllable by a handle for intermittently raising the platform, and to provide other means in conjunction therewith to prevent retrograde movement.

A still further object of the invention is to provide means for assisting the removal of boxes, crates or the like from the platform after being conveyed to the desired location.

Other objects of the invention are, to provide means for preventing transverse tipping of the truck; to prevent longitudinal tipping of the truck during operation of the platform; to provide a removable toe piece; to provide an adjustable toe piece and to provide means for temporarily fastening bags, barrels and the like on the platform.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 2, is a plan view of the truck with portions broken away to illustrate details of construction.

Fig. 3, is a fragmentary plan view of the operating lever, partly in section to show the operation of the pawl.

Fig. 4, is a side elevation of the operating lever with one end partially broken away and shown in section to illustrate the construction.

Fig. 5, is a fragmentary detailed view of the means for holding the stay legs when not in use.

Figure 1:
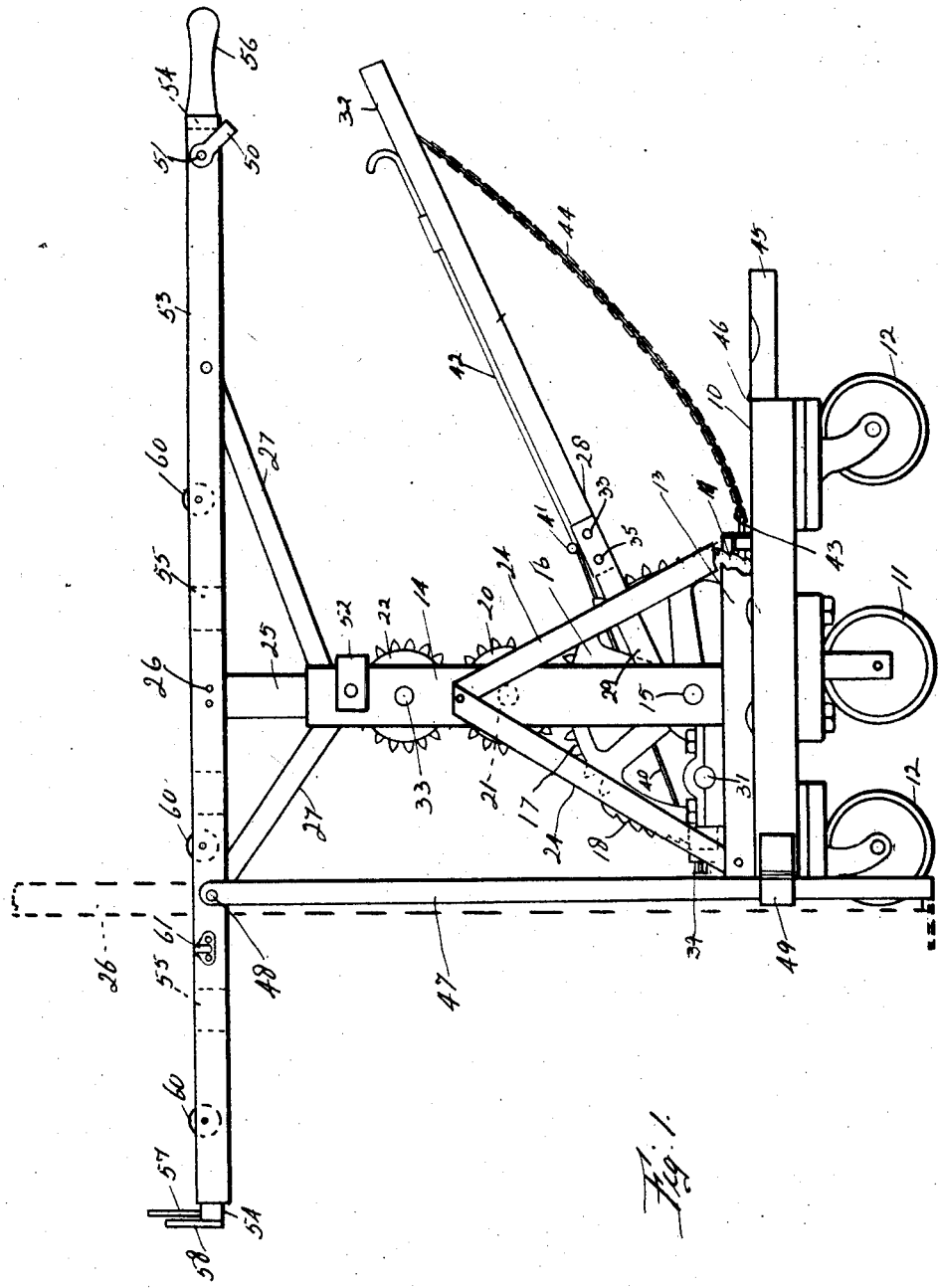
Fig. 1, is a side elevation of a hand truck constructed in accordance with my invention and showing in dotted lines the location of the platform when in a vertical position.
Figure 6:
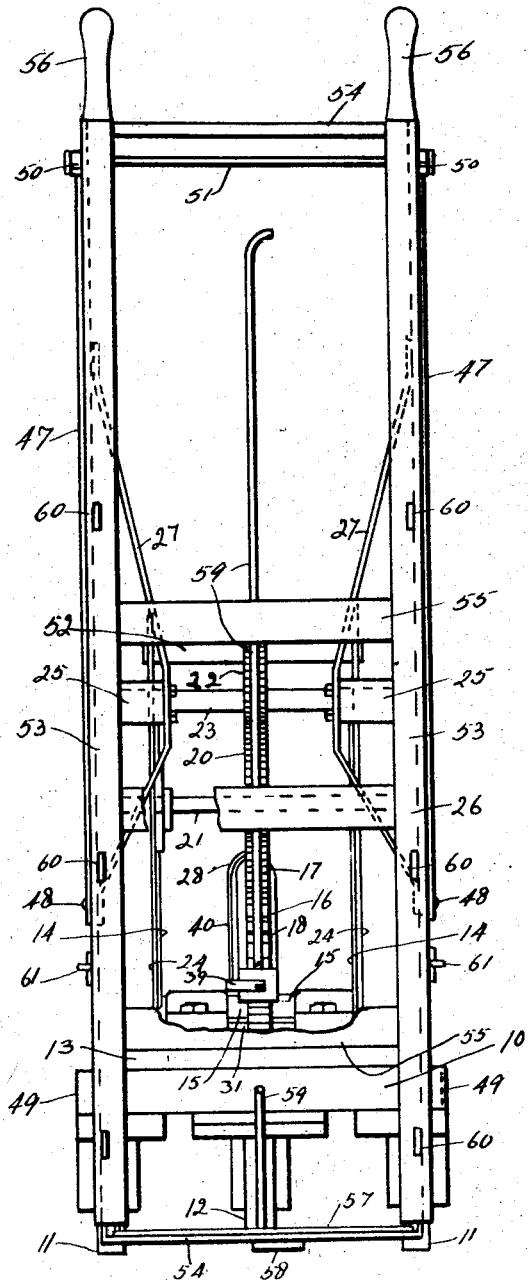
Fig. 6, is a front elevation of the truck with the platform in a vertical position and portions broken away to illustrate the construction.

In carrying out my invention as here embodied, 10 represents a suitable truck body mounted on wheels or casters 11 and 12, the casters 11 preferably being two in number one at each side of the body, and of slightly greater diameter than the casters 12, which are at the ends of the body, and said wheels or casters are of such types as to adjust themselves to the direction of travel desired by the operator of the truck.

On top of the body is mounted a frame 13, preferably formed of thin metal and of rectangular shape and to parts of this frame are secured the uprights or standards 14 having the ends of a shaft 15 journalled therein. The shaft 15 carries a main gear wheel 16 provided with ordinary spur gear teeth 17 and two sections of ratchet teeth 18 and 19. The spur gear teeth mesh with an intermediate gear 20 on a shaft 21 journalled in the uprights 14 and the intermediate gear in turn meshes with the driven gear 22 fixed to a shaft 23 journalled in the uprights 14. The uprights are strengthened by braces 24 having one end of each secured to an upright and the other ends fixed in the frame 13.

To the shaft 23 are fixed suitable arms 25 which carry the platform 26, said platform being braced by suitable stays 27 having their inner ends fixed to the arms 25 and their outer ends fastened to the platform.

From the above description it will be noted that any movement of the main gear 16 will transmit motion to the platform thru the medium of the other gears, and in order to rotate the main gear 16 I provide an operating lever 28 which includes a yoke 29, having bearings 30 journalled on an axle 31 and between parts of the yoke is pivoted a handle 32 by means of a bolt 33 or its equivalent, and said handle may have a notch 34 therein for registration with another bolt 35 when the handle 32 is in operative position. The yoke 29 is so constructed as to provide a housing 36 for a spring 37 which normally forces the ratchet pawl 38 inward to hold it in engagement with the ratchet section 18 of the main gear wheel 16.

In order to withdraw the pawl 38 I provide a rocker 39, one end of which is pivoted to the pawl 38 while the other end has a rod 40 attached thereto and hingeably connected as at 41 with the pull rod 42, slidably mounted on the handle 32.

At the rear of the frame 13 is another spring actuated pawl 43 of any well-known construction for coaction with the ratchet 19 of the main gear wheel 16 to prevent retrograde movement of said main wheel and in order that the pawl 43 may be conveniently actuated a chain or other equivalent flexible means 44 is attached to the pawl 43 and handle 32 of the operating lever.

From the foregoing it will be seen that by moving the operating lever up and down, the main gear wheel will be rotated intermittently for the raising of platform and when the operating lever is moved upward so as to engage another ratchet tooth on the section 18, the pawl 43 will prevent retrograde movement, but when it is desired to lower the platform, the pawl 43 may be drawn out of engagement with the ratchet tooth section 19 by means of the chain, 44, and by drawing outward on the pull rod 42 the operating lever will be disconnected from the main wheel, thereby permitting the gearing to revolve for lowering the platform.

When raising the platform with any considerable weight thereon and the operator desires to assure himself against tipping of the truck, the foot piece 45 may be swung out of the position shown in Figs. 1 and 2, and by placing his foot thereon a certain counterbalancing force can be applied to the truck.

This foot piece is hinged to the body 10 at 46, and when not in use is swung over upon said body.

In order to prevent lateral tipping of the truck while supporting a heavy weight, stay legs 47 are provided which are pivoted to the platform 26 at 48 and when in use swing down so as to enter the guides 49, but when not in use said stay legs are swung up parallel with the sides of the platform and their ends enter stirrups 50 fixed to the ends of a rotatable rod 51 journalled in the sides of the platform so that by grasping the rod 51 intermediate its ends and rotating it, the stay legs 47 will be released so as to drop into the positions shown in Fig. 1, and in order to prevent the platform moving too far backward or beyond the center, a stop 52 is fixed to the uprights 14 and spans the stops between them so as to be engaged by the stays 27 when the platform is raised as shown in Fig. 1.

The platform 26 is preferably made up of angle irons or other metal sections and includes the sides 53, ends 54 and intermediate cross pieces 55, the latter preferably being concave or curved downward so as to act as a cradle for barrels and the like. At the rear end of the platform are provided handles 56 for readily moving the truck, while at the front end is provided a removable toe piece 57 which is attached to the forward end piece 54 when bags or the like are to be transported on the truck, but is preferably removed when boxes, crates or the like are to be transported in which case the adjustable toe piece 58 is utilized. The adjustable toe piece 58 is of such width that when in the position shown in Fig. 2, its upper edge lies below the edge of the end piece 54, and this adjustable toe piece is fixed to a rod 59 journalled in the forward end piece 54, and extending rearwardly to a point in proximity to the rear of the platform whereby it will be within easy access of the operator.

On the sides of the platform are journalled suitable rollers 60 which will assist in causing a box, crate or the like to be discharged from the platform when the latter is tilted, and the adjustable toe piece 58 turned down.

In order to securely hold an article upon the platform during the transportation, suitable cleats or hooks 61 are mounted on the sides of the platform so that a chain, rope or the like may be fastened thereto.

Of course I do not wish to be limited to the exact details of construction as herein shown as these may be varied within the limits of the appended claims without departing from the spirit of my invention.

Having thus fully described my invention, what I claim as new and useful is:—

1. A hand truck including a wheel supported body, uprights on said body, a platform swingingly mounted between the uprights and a train of gears for transmitting motion to the platform, one of said gears including ratchet teeth sections, in combination with an operating lever pivotally mounted on the body and including a yoke, a spring actuated pawl for coaction with one of the ratchet teeth sections, means carried by the operating lever for moving the pawl against the action of the spring, another spring actuating pawl located between the body for coaction with the other ratchet teeth section and flexible means attached to the last named pawl and to the operating lever whereby said last named pawl may be disengaged from its ratchet teeth section.

2. The structure set forth in claim 1 wherein the operating lever and the means for actuating the first mentioned pawl are each formed in two sections pivoted together.

3. A hand truck including a wheel supported body, uprights on said body, a platform swingingly mounted between said uprights, means for actuating the platform, said platform including side and end members, a rod journalled in one of the end pieces and extending longitudinally of the platform to within proximity of the opposite end of said platform, and a toe piece fixed to the rod adjacent the end piece in which the latter is journalled, whereby said toe piece may be swung below the end piece.

In testimony whereof, I have hereunto affixed my signature.

JOSEPH CHVOJKA.